US005948449A

United States Patent [19]

Chen

[11] Patent Number: 5,948,449

[45] Date of Patent: Sep. 7, 1999

[54] SLUG PRODUCTION DEVICE FOR BRICK-MAKING MACHINES

[76] Inventor: Yu-Fu Chen, No. 49, Y Twu Ku, Lin 9, Taoyuan, Taiwan

[21] Appl. No.: 08/989,269

[22] Filed: Dec. 11, 1997

[51] Int. Cl.[6] .......... B29C 47/54

[52] U.S. Cl. .......... 425/198; 425/202; 425/203; 425/382 R; 425/464

[58] Field of Search .......... 425/376.1, 449, 425/198, 464, 202, 382 R, 203, 405.1

[56] References Cited

U.S. PATENT DOCUMENTS

| | | | |
|---|---|---|---|
| 1,587,300 | 6/1926 | Hanley, Jr. | 425/376.1 |
| 1,898,381 | 2/1933 | Mooney | 425/476.1 |
| 2,485,523 | 10/1949 | Ashbaugh | 425/476.1 |
| 2,605,531 | 8/1952 | McElroy | 425/376.1 |
| 3,507,015 | 4/1970 | Heatlie | 425/376.1 |

*Primary Examiner*—Harold Pyon
*Assistant Examiner*—Joseph Leyson
*Attorney, Agent, or Firm*—Rosenberg, Klein & Bilker

[57] ABSTRACT

The invention herein relates to a kind of slug production device for brick-making machines, specifically referring to a kind of slug production device that is mainly comprised of a raw brick mixture filler trough and a vacuum trough, below which are the the parallel and horizontal members of two pressure tubes and two forming tubes, and positioned at the rear of the two pressure tubes and the two forming tubes are a pair of pressure mechanisms and, furthermore, at the bottom section of the raw brick mixture filler trough and the vacuum trough is a swing-type aggregate crushing mechanism such that after the raw brick mixture is loaded into the filler trough, the raw brick mixture is conveyed precisely into the pressure tubes and the pressure mechanism pistons at the rear of the two pressure tubes operate in a reciprocal movement to convey the raw brick material slugs into the vacuum trough then the raw brick material aggregate conveyed into the vacuum trough are guided into the forming tubes by the pressure mechanism and, furthermore, subjected to an equal forming and output pressure by the reciprocal operation of the pistons in the pressure mechanism at the rear of the forming tubes, which enables the invention herein to effectively achieve increased working efficiency and consistent slug quality.

5 Claims, 6 Drawing Sheets

SLUG PRODUCTION DEVICE FOR BRICK-MAKING MACHINES

BACKGROUND OF THE INVENTION

The structure and operation of conventional slug production devices for brick-making machines, as indicated in FIG. 1, mainly consists of placing the raw brick material into the filler trough (D), after which two horizontal and parallel mixing blades (2) in the mixer tube (1) rotate in opposite directions and moves the raw brick material mixture into the mixer tube (1) and, at the same time, the screw rod (3) at the front end of the mixing blades (2) conveys the raw brick material into the mixing tube (2), which is then pulverized into granules and conveyed by crushing blades (4) in the vacuum trough (E), and inside the aforesaid vacuum trough (E) are two more pressure blades (5) in a horizontal and parallel configuration that rotate in opposite directions, such that the raw brick mixture granules in the vacuum trough (E) are conveyed into the forming tube (6) positioned below and, furthermore, moved forward by the screw rod (7) and pushed out through the forming holes (8), enabling the forming holes (8) to shape the material into long slugs. Undeniably, the structure and operation of this kind of slug production device for brick-making machines offers practical value and functionality and, furthermore, virtually all current slug production devices for brick-making machines utilize such a design. However, following long-term utilization, manufacturers find that the aforesaid devices have numerous shortcomings that await improvement, including:

(1) Although the raw brick mixture in the forming tube (6) is driven forward smoothly by the screw rod (7) along the circumferential surface around the screw rod (7), the aforesaid circumferential surface is subject to straight, slanted or spiral abrasion marks from the friction blocks of the lining sleeve. However, a lining sleeve having numerous friction blocks gives rise to insllation difficulties and inconvenience as well as wastes time and effort, especially at the interface of the friction blocks and the screw rod (7), where rapid wear easily occurs due to the continuous friction from the passage of raw brick material, which consequently requires frequent disassembly and replacement that is highly inconvenient and uneconomical.

(2) Since the friction blocks are directly against the circumferential surface of the forming tube (6) and thereby increase the friction that generates straight, slanted and spiral abrasion marks, when the screw rod (7) drives the raw brick mixture forward, the driven raw mixture etches numerous flow marks that in turn produces backflow, which not only prevents the screw driven raw brick material from exiting from the forming hole (8) in the desired quantity, but also reduces raw brick material mixing efficiency. At the same time, when the raw brick material additionally scours the straight, slanted and rotary abrasion marks, the actual required force of friction provided is greatly diminished, which drastically lowers the driving efficiency of the screw rod (7).

(3) Since the raw brick material inside the forming tube (6) is propelled forward by the drive mechanism of the screw rod (7), a direct increase in load is produced. As such, in actual operation, the aforesaid drive mechanism not only requires increased horsepower, but also entails the consumption of more fuel and generation of intense noise and, especially in the case of the drive components, the additional increase in load directly results in rapid wear and a shortening of service life that is not economical.

(4) Since the raw brick material inside the forming tube (6) utilizes the combined friction from the rotation and friction blocks of the driving screw rod (7) to gradually flow out into formed raw brick slugs, the center flow speed and the peripheral flow speed of the aforesaid slugs differs (the center flows faster because the friction is less, while the periphery flows slower due to the effect of the friction blocks) and, furthermore, the slugs cannot be produced in equal density. Therefore, when the slugs are baked after final cutting, changes in shape, cracks and breakage tend to frequently occur.

(5) Since the aforesaid raw brick material is placed into the filler trough (D), after which the aforesaid material must pass through the two rotating mixer blades (2) to be transported into the mixer tube (1) and then two rotating screw rod s (3) further convey the aforesaid mixture into the vacuum trough (E), therefore, the required installation of the aforementioned friction blocks constitute a drawback, the results of which are fully evident.

SUMMARY OF THE INVENTION

The primary objective of the invention herein is to provide a kind of improved structure slug production device for brick-making machines,wherein the pressure mechanism of the aforementioned filler trough and vacuum trough is capable of the directly pushing the raw brick material downwards by means of a separate left and a right reciprocal operation and the pistons of the pressure mechanism are integrated into both the pressure tubes and the forming tubes such that the contained raw brick material is directly conveyed under pressure; therefore, after the raw brick material is loaded into the filler trough, the aforesaid material is simply, conveniently, rapidly and, furthermore, precisely conveyed into the vacuum trough and compressed out through the forming holes.

Another objective of the invention herein is to provide a kind of improved structure slug production device for brick-making machines wherein the aforementioned two pressure tubes and forming tube each have an integrated piston and the raw brick material inside can be directly outputted under pressure and, unlike conventional devices, are not subject to the straight, slanted or spiral abrasion marks from the friction blocks of the lining sleeve on the inner circumferential surface of the aforesaid pressure tubes and forming tubes, which is obviously provides for greater installation simplicity and convenience .

Yet another objective of the invention herein is to provide a kind of improved structure slug production device for brick-making machines, wherein the utilization of the raw brick material inside the aforesaid pressure tubes and forming tubes consists of a direct pressure conveyance by the compressive action by the pistons of the pressure mechanism and, unlike conventional devices which achieve conveyance with a screw rod and friction blocks, the entire quantity of raw brick material can be outputted by the compressive force of the pistons and slug production efficiency is more efficient than that achieved by the screw rod driven approach of conventional devices in that the invention herein increases production efficiency, especially since the friction along the inner circumferential surface of the pressure tubes and the forming tubes is less than that of conventional devices and, furthermore, friction between outer circumferential surface of the pistons and the raw brick material does not occur, which effectively extends the service life of the components and thereby provides superior economic value.

Still another objective of the invention herein is to provide a kind of improved structure slug production device for brick-making machines, wherein the raw brick material inside the pressure tubes and the forming tubes is directly forced out by the pistons of the pressure mechanism and, unlike the screw rod and friction blocks of conventional devices, since the pistons are subjected to less load than the conventional screw rod, the pressure mechanisms utilizes less power, which effectively saves energy and improves noise levels and, of course, the service life of drive components can be effectively prolonged.

A final objective of the invention herein is to provide a kind of improved structure slug production device for brick-making machines, wherein the raw brick material inside the aforementioned forming tubes are shaped by the high compression generated by the pistons and, therefore, the slugs produced are of equal density, with no change in shape, cracking or breakage occuring when the slugs are fired after final cutting.

DETAILED DESCRIPTION OF THE INVENTION

Figure 1:
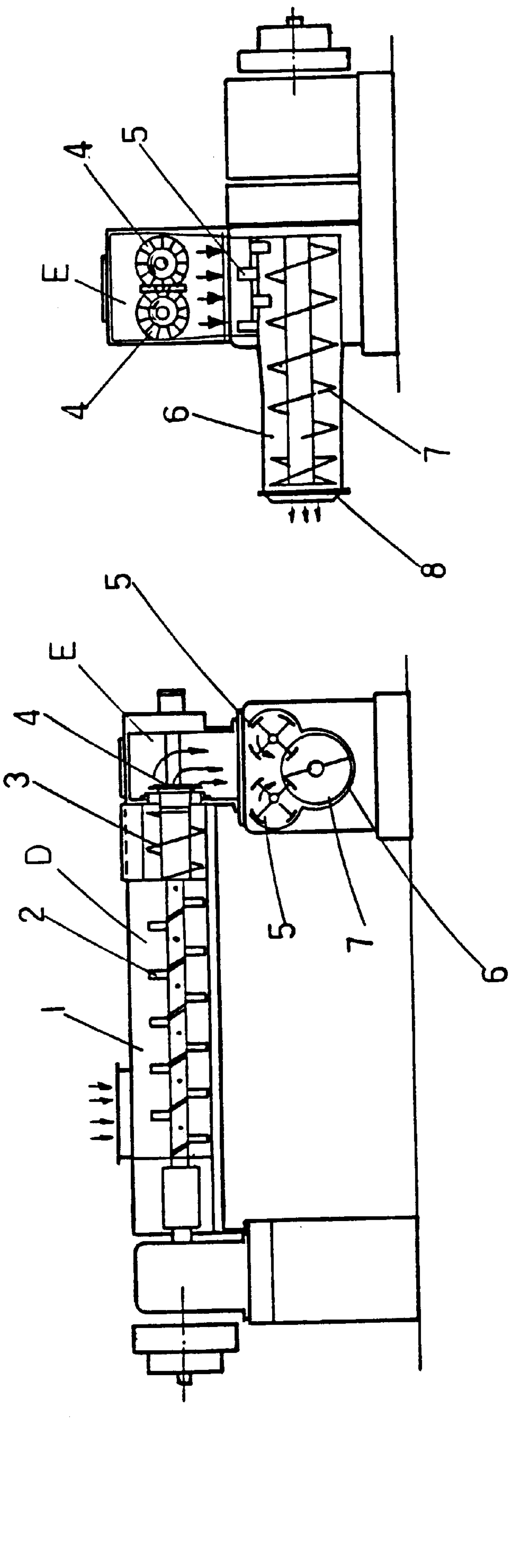
FIG. 1 (PRIOR ART)
FIG. 1 is an orthographic drawing of a conventional slug production device for brick-making machines.
Figure 2:
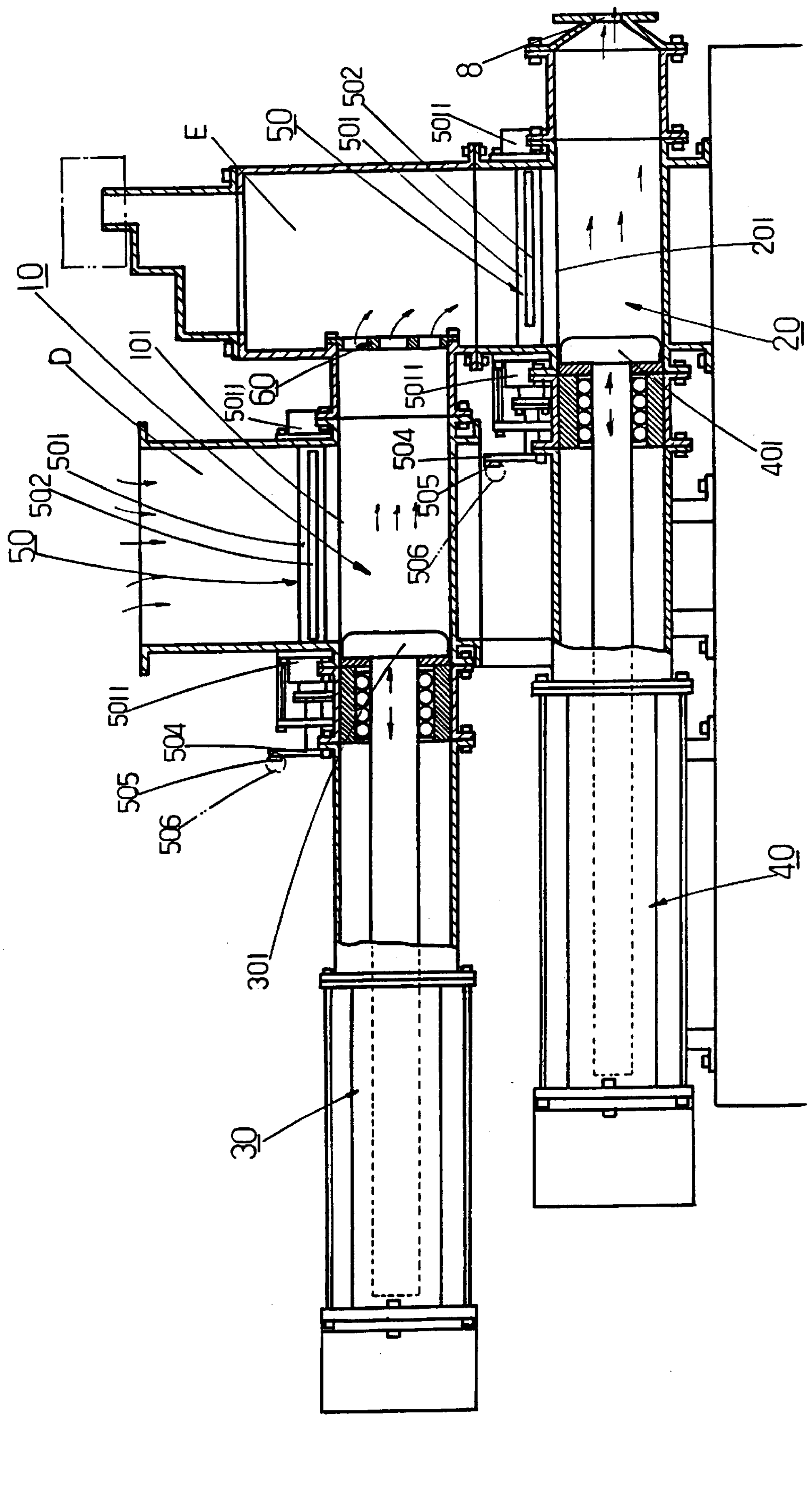
FIG. 2 is a cross-sectional drawing of the invention herein as viewed from a frontal perspective.
Figure 3:
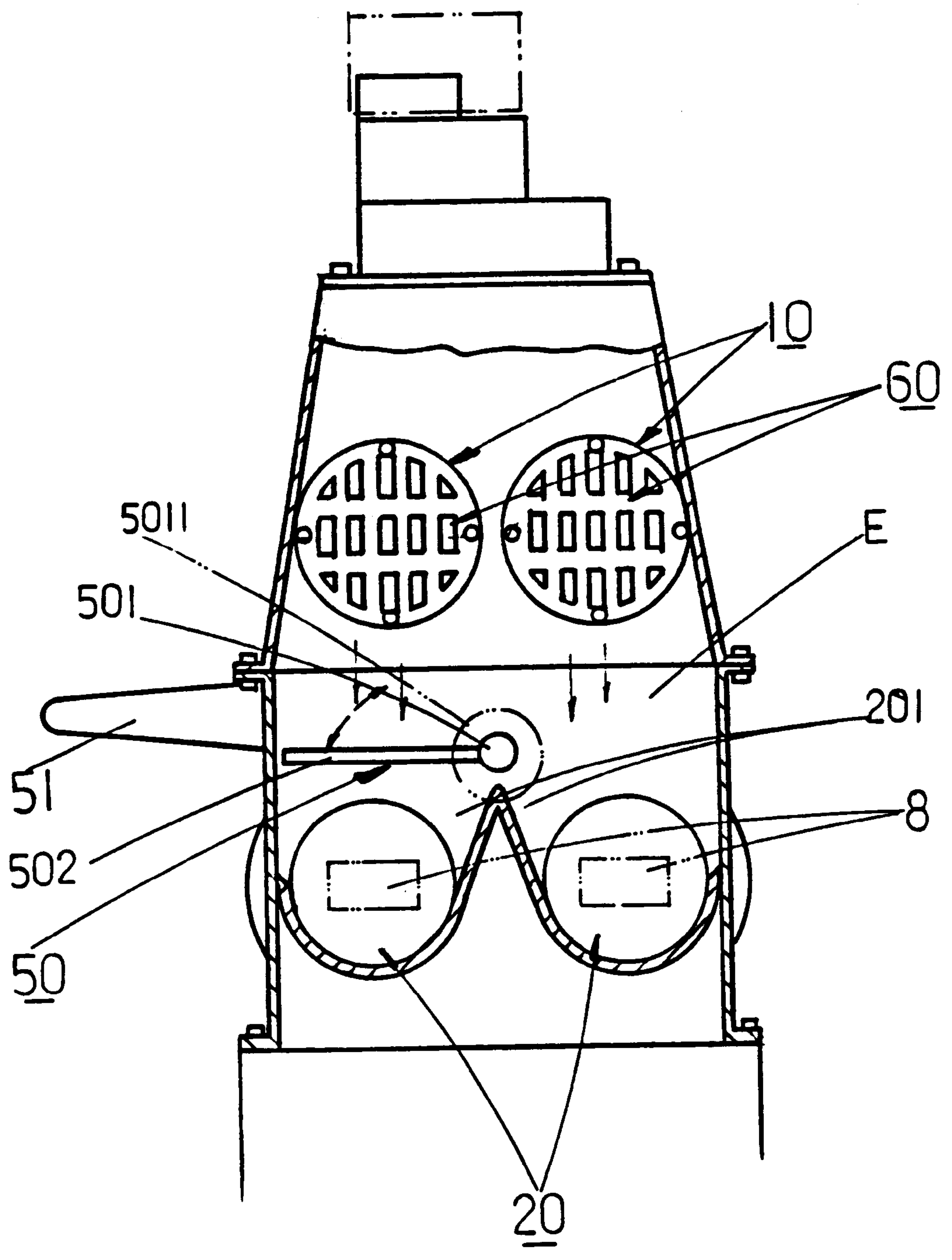
FIG. 3 is a cross-sectional drawing of the invention herein as viewed from a right lateral perspective.
Figure 4:
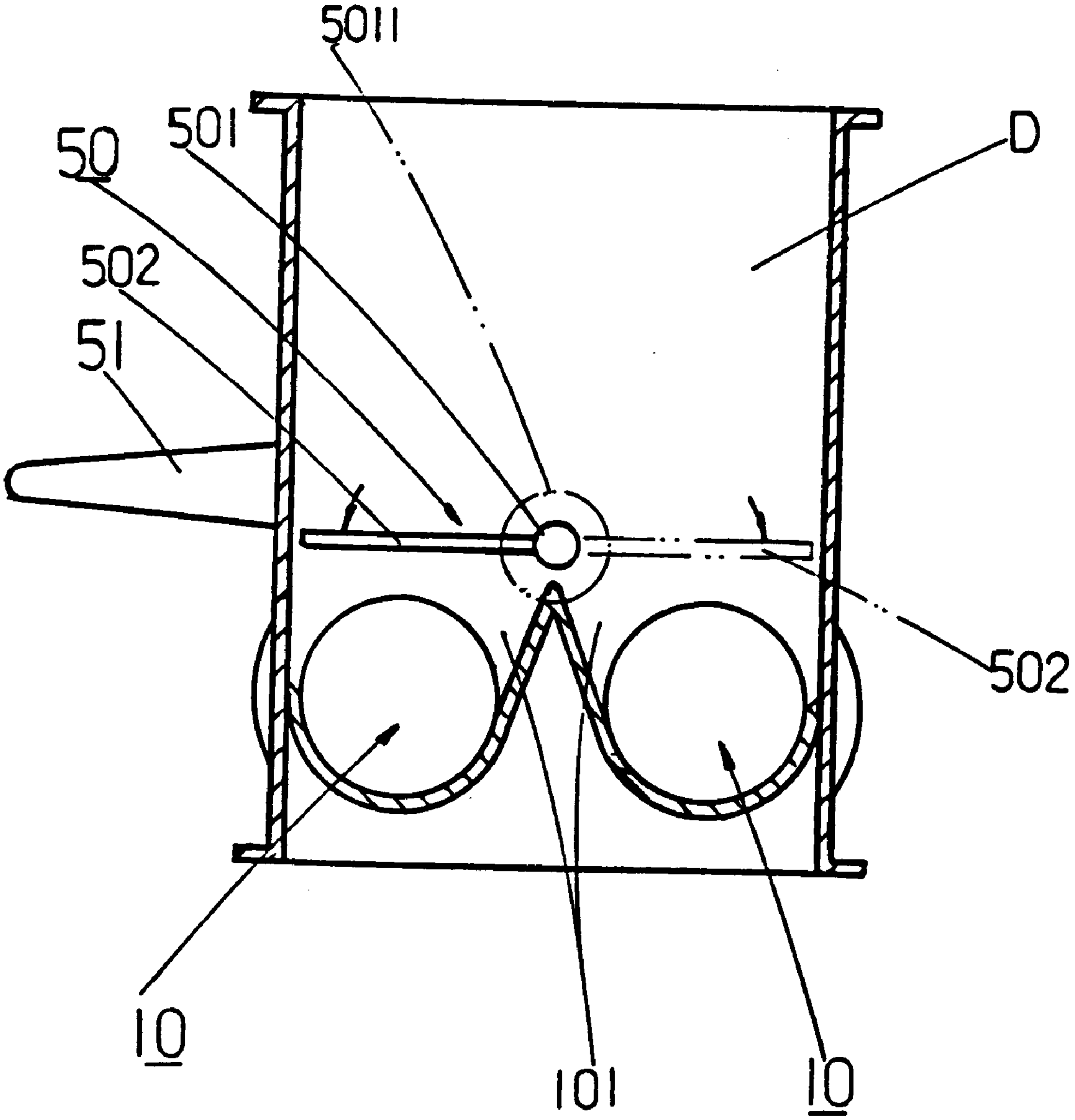
FIG. 4 is a cross-sectional drawing of the pressure tube and the raw brick mixture filler trough of the invention herein as viewed from a left lateral perspective.

Referring to FIG. 2, FIG. 3 and FIG. 4, the invention herein is a kind of improved structure slug production device for brick-making machines that is mainly comprised of a raw brick mixture filler trough (D) and a vacuum trough (E), below which are the parallel and horizontal members of two pressure tubes (10) and two forming tubes (20), and positioned at the rear of the two pressure tubes (10) and the two forming tubes (20) are the respective pressure mechanisms (30) and (40) (the aforesaid mechanisms can be hydraulic cylinders or other powering mechanisms) and, furthermore, installed at the front end of each of the aforesaid pressure mechanisms (30) and (40) are the pistons (301) and (401), and at the bottom section of both the raw brick mixture filler trough (D) and the vacuum trough (E) is an aggregate crushing mechanism (50) that swings to the left and to the right.

Figure 5:
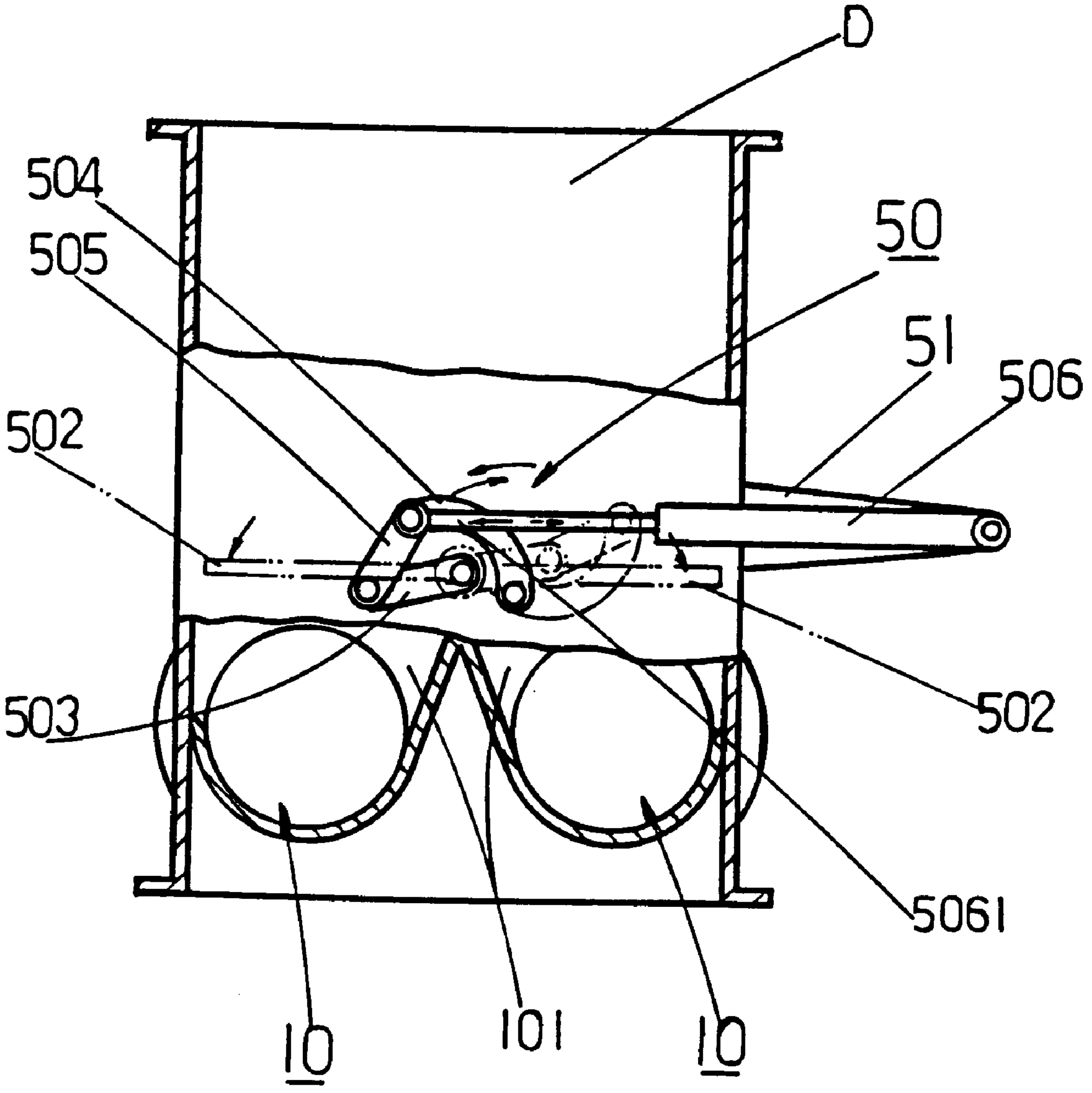
FIG. 5 is a cross-sectional drawing of the invention herein, showing the aggregate crushing mechanism installed with the raw brick mixture filler trough.
Figure 6:
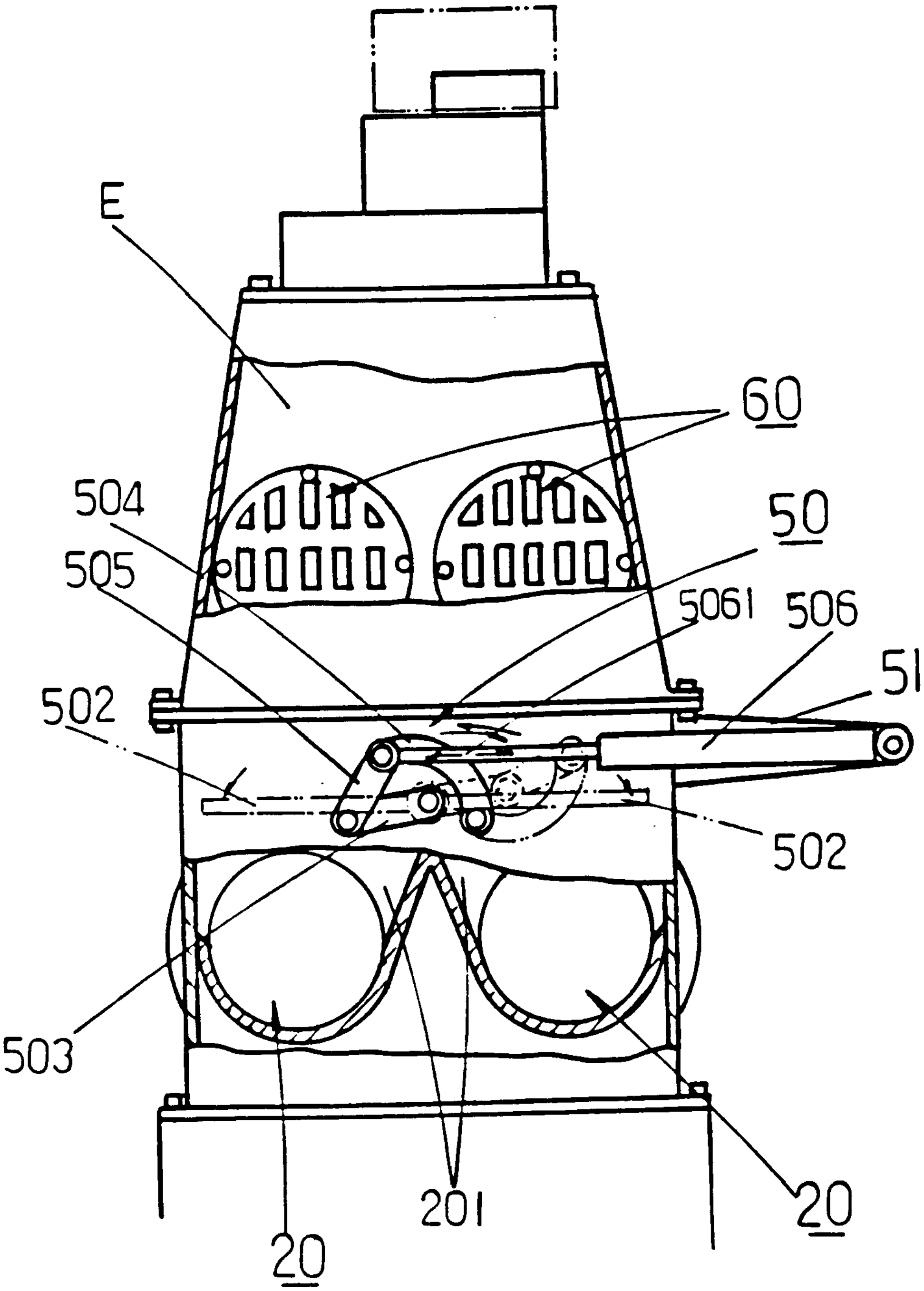
FIG. 6 is a cross-sectional drawing of the invention herein, showing the aggregate crushing mechanism installed with the vacuum trough.

Referring to FIG. 5 and FIG. 6, the aggregate crushing mechanism (50) mainly consists of a screw rod (501) that is installed at a center position under the raw brick mixture filler trough (D) and the vacuum trough (E), and above and in between the input ports (101) of the two pressure tubes (10) and the input ports (201) of the two forming tubes (20), with both ends mounted in the bearing blocks (5011) positioned on the exterior walls of the raw brick mixture filler trough (D) and the vacuum trough (E), which thereby enables the screw rod (501) to rotate freely; an aggregate squeeze plate (502) that is mounted above the screw rod (501) facing the input ports (101) of the two pressure tubes (10) and the input ports (201) of the two forming tubes (20); two oscillating rods (503) and (504) positioned at the outer sides of the raw brick mixture filler trough (D) and the vacuum trough (E), such that one end of the oscillating rod (503) is mounted beyond the end of the screw rod (501) and the end of the other oscillating rod (504) is in a rotatable state and installed at the outer edge of the pressure tubes (10) and the forming tubes (20) and, furthermore, is adjacent to the oscillating rod (503), a connecting rod (505) that is linked to the other ends of the two oscillating rods (503) and (504), permitting the coupled movement of the two oscillating rods (503) and (504); a drive mechanism (506) (can be a hydraulic cylinder) that is installed on the extension rod (51) of the machine, with a drive rod (5061) installed at the linkage point between the oscillating rod (504) and the connecting rod (505) such that during extension and retraction, the aforesaid oscillating rods (503) and (504), and the connecting rod (505) move in unison and, furthermore, causes the aggregate squeeze plate (502) of the screw rod (501) to repeatedly swing 180 degrees to the left and to the right.

Since the aggregate squeeze plate (502) of the aggregate crushing mechanism (50) is brought into a repeated leftward, rightward, upward and downward swinging motion by the drive mechanism (506), therefore, the contents in the raw brick mixture filler trough (D) are directly forced down by the aggregate squeeze plate (502) and precisely guided into the pressure tubes (10) though the input ports (101); furthermore, since each of the aforesaid two pressure tubes (10) is conjoined to the reciprocating pistons (301) of a pressure mechanism (30), as the raw brick mixture is guided into the two pressure tubes (10), the reciprocating movement of the pistons (301) directly compresses and thereby moves the aforesaid mixture along, and following extrusion into long slugs through a grid screen (60), the raw material is evenly guided into the vacuum trough (E); of course, the drive mechanism (506) within the aforesaid aggregate crushing mechanism (50) and the two forming tubes (10) has adjustable settings to support flexible operation, such that when the aggregate squeeze plate (502) of the aggregate crushing mechanism (50) is swinging leftward to direct the raw brick mixture towards the pressure tube (10), the pressure mechanism piston (301) inside the aforesaid right pressure tube (10) is pushing the raw brick mixture outward, and following the retraction of the aforesaid piston (301), the aggregate squeeze plate (502) of the aggregate crushing mechanism (50) swings rightward and the content of the raw brick mixture filler trough (D) is directly and gradually pushed into the pressure tube (10) and, at the same time, the pressure mechanism piston (301) inside the aforesaid left pressure tube (10) continues to push the raw brick mixture inside the tube outward, enabling the continuous conveyance of the raw brick mixture into the vacuum trough (E).

Furthermore, since the aggregate crushing mechanism (50) is installed below the bottom section of the vacuum trough (E), and each of the two forming tubes (20) under the aggregate crushing mechanism (50) are equipped with a piston (401) that operates in reciprocal manner, when the aforementioned slugs of raw brick mixture are guided into the vacuum trough (E), the operation of the aggregate crushing mechanism (50) directly and precisely forces the aforesaid slugs into the forming tubes (20), which are then compressed outward by the reciprocal action of the aforesaid two pistons (401) and finally outputted under pressure as slugs of consistent shape through the forming holes (8).

Furthermore, since the raw brick mixture in the raw brick mixture filler trough (D) and the vacuum trough (E) is conveyed under pressure due to the coordinated action of the aggregate crushing mechanism (50) with the pressure tubes (10) as well as the forming tubes (20) and the pressure mechanisms (30) and (40), the friction produced by the pressure mechanisms pistons (301) and (401) pushing against the raw brick mixture is less than that of conventional devices, the compressed raw brick mixture can be fully conveyed and dispensed unlike conventional devices that are subject to occasional backflow conditions due to the friction block abrasions; therefore, in the areas of reduced component friction, easier component installation and maintenance, larger fuel savings, better noise improvement and increased raw brick slug production device installation efficiency, the invention herein offers more actual usable performance and greater value than conventional devices. Of course in the invention herein, since the raw brick material in the forming tube (20) are directly pushed by the piston (401), unlike conventional devices in which the screw rod and the friction blocks produce conveyance by means of friction, therefore, the center flow speed and the peripheral flow speed of the aforesaid slugs through the forming holes (8) remains the same, unlike conventional devices in which the center flow speed is faster than the peripheral flow speed, and as such, the slugs produced are of equal density, no change in shape, cracking or breakage tends to occur when the slugs are fired after final cutting.

What is claimed is:

1. A slug production device for brick-making machines comprising:

a raw brick mixture filler trough for containing raw brick mixture to be crushed having a filler trough inlet and a filler trough outlet;

first aggregate crushing means for crushing said raw brick mixture from said raw brick mixture filler trough, said first aggregate crushing means fixedly mounted inside said raw brick mixture filler trough and covering said filler trough outlet;

a pressure tube structure having two pressure tubes for receiving said raw brick mixture from said raw brick mixture filler trough, said raw brick mixture entering said pressure tube structure through said filler trough outlet, and said raw brick mixture exiting said pressure tube structure through a pair of pressure tube outlets;

first pressure drive means for driving a first set of pistons within said pressure tube structure;

a pair of grid screens respectively fixedly secured to said pressure tube outlets, each of said grid screens having a plurality of openings for extrusion of said raw brick mixture into slugs;

a vacuum trough for receiving said slugs from said pressure tube structure, said slugs entering said vacuum trough through said grid screens, and exiting said vacuum trough through a vacuum trough outlet;

second aggregate crushing means for crushing said slugs, said aggregate crushing means fixedly mounted within said vacuum trough and covering said vacuum trough outlet;

a forming tube structure having a pair of forming tubes for receiving said slugs from said vacuum trough, said slugs entering said forming tube structure through said vacuum trough outlet, and said slugs exiting said forming tube structure through a pair of forming outlets;

second pressure drive means for driving a second set of pistons within said forming tube structure;

a forming nozzle fixedly secured to said forming outlets, said forming nozzle having a plurality of forming holes for forming bricks.

2. The slug production device for brick-making machines as recited in claim 1 where said first aggregate crushing means comprises a first squeeze plate mounted to a first drive means for continuous oscillatory motion of said first squeeze plate in both horizontal and vertical directions.

3. The slug production device for brick-making machines as recited in claim 1 where said second aggregate crushing means comprises a second squeeze plate mounted to a second drive means for continuous oscillatory motion of said second squeeze plate in both horizontal and vertical directions.

4. The slug production device for brick-making machines as recited in claim 1 where said first set of pistons operate in coordinated reciprocal motion.

5. The slug production device for brick-making machines as recited in claim 1 where said second set of pistons operate in coordinated reciprocal motion.

* * * * *